United States Patent [19]

Ando

[11] 4,125,943
[45] Nov. 21, 1978

[54] METHOD AND APPARATUS FOR DETECTING THE SHAPES OF WELD BEADS

[75] Inventor: Shimon Ando, Hitachi, Japan

[73] Assignee: Hitachi, Ltd., Japan

[21] Appl. No.: 771,247

[22] Filed: Feb. 23, 1977

[30] Foreign Application Priority Data

Feb. 24, 1976 [JP] Japan .................................. 51-18449

[51] Int. Cl.² .............................................. G01B 7/28
[52] U.S. Cl. ................................ 33/174 P; 33/174 L; 219/124.34; 228/9; 324/207; 318/568; 318/576; 318/653
[58] Field of Search ............. 33/1 M, 169 D, 169 BR, 33/173 E, 172 R, 174 P, 174 PC, 174 R, 174 L; 219/124.02, 124.34, 125 PL, 125 R; 228/9, 103; 73/37.5; 324/207, 208; 318/568, 576, 653

[56] References Cited

U.S. PATENT DOCUMENTS

| | | | |
|---|---|---|---|
| 2,971,079 | 2/1961 | Sommeria | 219/125 PL |
| 2,992,375 | 7/1961 | Mustonen et al. | 73/37.5 |
| 3,217,204 | 11/1965 | Nance | 324/208 |
| 3,250,012 | 5/1966 | Hilton et al. | 33/172 E |
| 3,481,043 | 12/1969 | Esch | 33/174 P |
| 3,484,667 | 12/1969 | Wofsey | 219/125 PL |
| 3,612,818 | 10/1971 | Bechtle | 219/125 PL |
| 3,646,309 | 2/1972 | Smith, Jr. et al. | 219/124.02 |
| 4,019,131 | 4/1977 | Yamada et al. | 33/174 L |

FOREIGN PATENT DOCUMENTS

84,548 11/1971 German Democratic Rep. ......... 228/9

Primary Examiner—Richard E. Aegerter
Assistant Examiner—John W. Shepperd
Attorney, Agent, or Firm—Craig & Antonelli

[57] ABSTRACT

A mechanism for driving a sensor for detecting the shapes of weld beads is completely separated from a mechanism for driving a welding torch with the sensor being operative independently of the welding torch. Prior to or during a welding operation, the sensor is moved above the groove in a direction perpendicular to a weld line in accordance with a command from a computer. Information about the shapes, in particular, information about the shapes of cross-sections of a groove portion which has been obtained by scanning is first stored in a memory. Then, information processing is executed so as to calculate a central position of the groove, the amount of dislocation, and the shape of the bead. In case enough information for enabling a welding operation to be carried out satisfactorily has not been obtained by a single scanning, particularly in case the groove portion is too deep to enable the sensor to perform its detection function satisfactorily, the sensor is again moved in scanning motion in the direction perpendicular to the weld line and in a vertical direction to collect information. The information thus collected is combined with the information previously obtained, so as to detect the accurate shapes of weld beads.

8 Claims, 10 Drawing Figures

METHOD AND APPARATUS FOR DETECTING THE SHAPES OF WELD BEADS

BACKGROUND OF THE INVENTION

This invention relates to a method and an apparatus for detecting the shapes of weld beads.

A welding operation is generally performed at operation sites where atmosphere is liable to be polluted by gases and heated by heat generated in large quantities during the operation and is therefore injurious to human health. Welding operators are thus forced to do their jobs in a considerably poor working environment. In view of this fact, it has hitherto been earnestly desired that automation of a welding operation be realized and manual attention be eliminated.

What is required first of all in effecting automation of a welding operation is to automate detection of the shapes of weld beads, which detection has hitherto been carried out by relying on the human eye. Various apparatus and methods have been proposed and developed for carrying out detection of the shapes of weld beads, etc. However, none of these apparatus and methods have been developed to an extent such that they can have application with success in welding operations of various types in actual practice.

In one detecting apparatus known in the art, a detector capable of detecting a portion of a groove, such as the center or the edges of the groove, is incorporated into a welding machine in a manner such that the detector acts as a unit integral with a welding torch. Such detector carries out detection as it follows the welding torch which is moved over the center or the edges of the groove at all times during the welding operation. When such apparatus is used, it is impossible to detect a change in the width of a groove line where there is a change in the width in some portion thereof and to detect a weld bead, although it is possible to move the welding torch along a groove line. Such detecting apparatus is not capable of enabling an effective welding operation to be performed by accommodating the local change in the width of the groove or in conformity with the weld bead in joining components by welding.

In another method of the prior art for detecting the shapes of weld beads a plurality of detecting elements capable of detecting a vertical displacement from a weld line are arranged perpendicular to the weld line and located equidistantly from one another, and the shapes of the the weld bead are detected on the basis of the amount of displacement detected by such detecting elements. This method has, however, a disadvantage in that the accuracy and precision with which detection is performed may vary depending on the spacing between the detecting elements with a result that it is impossible to perform detection with a high degree of accuracy and precision.

Still another method aiming at improving the aforesaid methods and apparatus of the prior art consists in moving a detecting rod within a groove and determining the central position of the groove and the amplitude of the rod on the basis of the positions of opposite ends of the rod which are brought into contact with the groove face. This method has the disadvantage of being unable to detect the included angle of a groove, the amount of dislocation and the shape of a weld bead.

In automating a welding operation to permit welding of components to be performed automatically without requiring manual attention, it is essential to detect the shape of a weld bead which changes from moment to moment during a welding operation, as well as to detect the positions and dimensions of various parts of the groove, such as the center and the edges thereof, the amount of dislocation and the included angle of the groove. In particular, when multi-layer padding welding is performed, the target position of the welding torch must be varied depending on the shape of a weld bead. Thus, detection of the shape of weld beads is an important factor in producing a sound weld.

The detecting methods of the prior art which have been developed up to the present time are unable to detect the shapes of weld beads or able to detect them only with a low degree of accuracy and precision. Thus, it has hitherto been necessary to provide an operator who keeps watch on the welding operation being performed, even if the welding operation is automated.

SUMMARY OF THE INVENTION

An object of this invention is to provide a method and an apparatus which are capable of detecting, with a high degree of accuracy and precision, the edges of grooves, the center thereof, the amount of dislocation, the included angle of the groove, the shape of a root, and the shape of a weld bead.

Another object is to achieve full realization of the advantages from the automation of a welding operation which requires no manual attention.

One of the outstanding characteristics of the detecting method according to the invention is that a sensor is moved in a scanning motion in a direction perpendicular to a weld line and produces an output representing the result of the detection which is fed to a memory to be stored therein, and then the shapes of the weld bead are obtained by means of a computer on the basis of the data stored in the memory.

Another outstanding characteristic of the present detecting method is that, by acknowledging the fact that the sensor is limited in its scope, the sensor is moved in a scanning motion not only in the direction perpendicular to the weld line but also vertically (in a direction along the depth of the groove or the height of the work) during the scanning movement, so as to thereby increase the degree of accuracy and precision with which detection is carried out.

According to the invention, there is provided a detecting apparatus comprising a sensor, an X-direction driving device for driving the sensor in an X-direction pependicular to a weld line, a Y-direction driving device for driving the sensor in a Y-direction perpendicular to a work surface, X-position and Y-position signal generators for generating position signals indicative of the position of the sensor, a memory for storing the value of a quantity detected by the sensor and the values of the X-position and Y-position signals generated by the position signal generators, a computer for determining the shapes of weld beads on the basis of the data stored in the memory and giving instructions on a position to which the sensor should be moved, and another memory for storing the value of an instruction given by the computer.

DESCRIPTION OF THE PREFERRED EMBODIMENT

Figure 1:
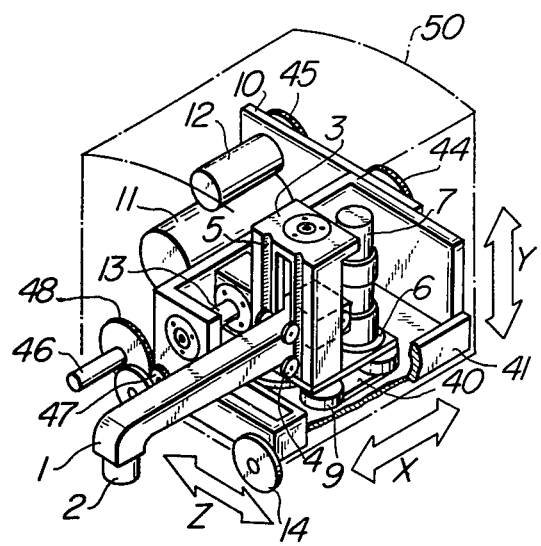
FIG. 1 is a perspective view of the driving mechanism of the detecting apparatus according to the present invention.
Figure 2:
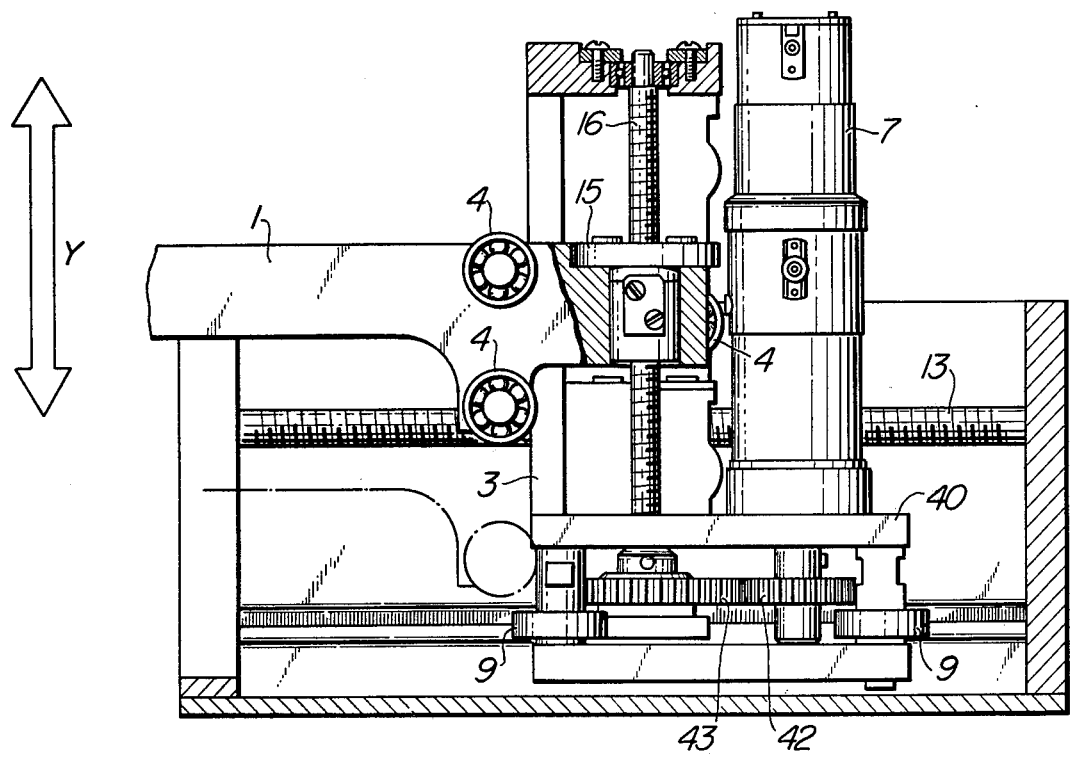
FIG. 2 is a side view of the driving mechanism shown in FIG. 1.
Figure 3:
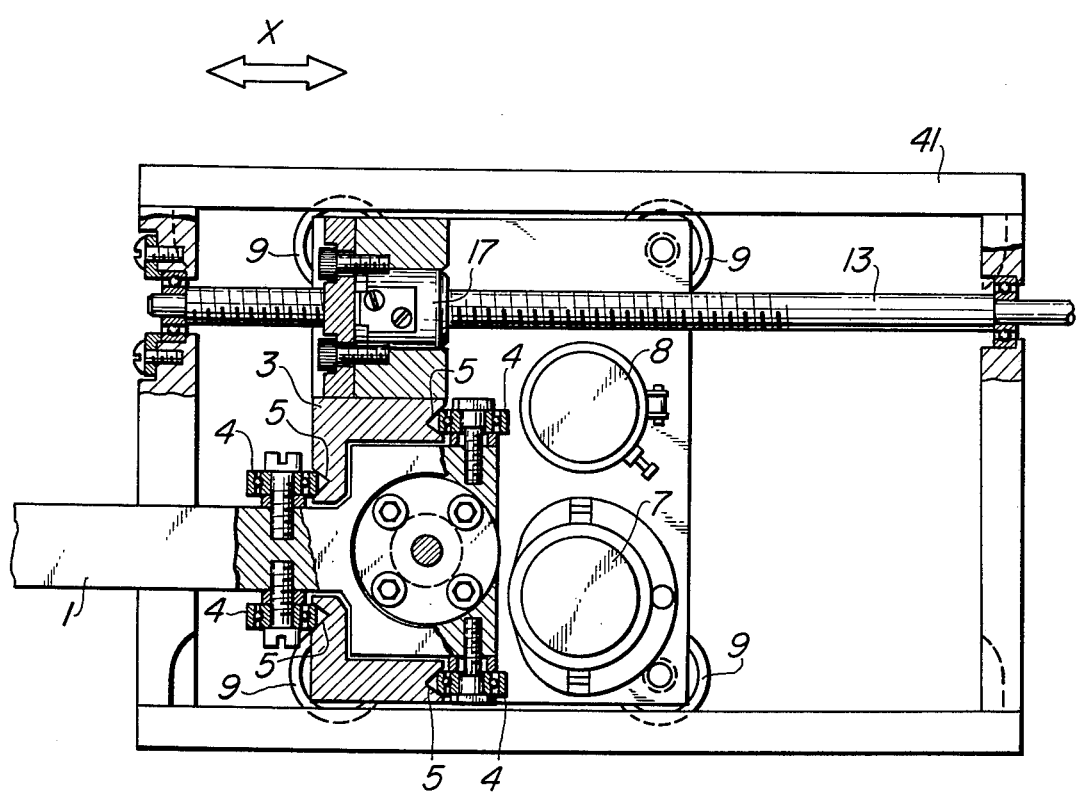
FIG. 3 is a plan view of the driving mechanism shown in FIG. 1.

A preferred embodiment of the invention will now be described with reference to the accompanying drawings. FIGS. 1 to 3 show one form of a mechanism for driving a detecting apparatus according to the invention, which is completely separated from a welding torch driving mechanism and can be driven independent thereof.

As shown, a movable member 40 has four rollers 9 each attached to one of the four corners thereof and is supported by a frame 41 (See FIG. 3) for movement relative thereto in an X-direction perpendicular to a weld line. A column 3 is secured to an upper surface of the movable member 40 and formed thereon with guide grooves 5 oriented in a vertical direction or Y-direction. An arm 1 has a sensor 2 mounted at its forward end and a plurality of rollers 4 attached to its base. Rollers 4 are adapted to move in the guide grooves 5 formed in the column 3, so that the arm 1 can be moved in the Y-direction.

A ball screw 15 (See FIG. 2) is secured to the base of the arm 1. A threaded rod 16 is rotatably journaled in the column 3 and is also rotatable while being in threadable engagement with the ball screw 15. A Y-direction driving motor 7 (See FIG. 2) is secured to the movable member 40, the rotation of the motor is transmitted through speed reducing gears 42 and 43 to the threaded rod 16. Rotation of the threaded rod 16 causes the arm 1 to move in the Y-direction.

A Y-direction positional signal generator 8 (See FIG. 3) for the sensor 2 is also secured to the movable member 40. The signal generator 8, which may be a potentiometer, receives at its input the value of an angle of rotation of gear 42 and produces as its output a Y-direction positional signal for the sensor 2. Actuation of the Y-direction driving motor 7 causes gears 42 and 43 to rotate. Rotation of gear 43 causes the threaded rod 16 to rotate, so that ball screw 15 and arm 1 move vertically. That is, the vertical position of the arm 1 corresponds to the angle of rotation of gear 42, so that the vertical position of the arm 1 can be detected from the angle of rotation of gear 42.

The column 3 and the movable member 40 are driven to move in the X-direction as described herein below. As shown in FIG. 3, the column 3 has a ball screw 17 secured thereto to act as a unit therewith, said ball screw 17 being in threadable engagement with a threaded rod 13 rotatably journaled in the frame 41. On the other hand, as shown in FIG. 1, another frame 10 secured to the frame 41 to act as a unit has mounted thereon an X-direction driving motor 11 whose rotation is transmitted to the threaded rod 13 through a speed reducing gear (not shown) mounted on an output shaft of the motor and a gear 44 secured to an end portion of the threaded rod 13. Thus, rotation of motor 11 causes threaded rod 13 to rotate, so that the column 3 and movable member 40 are driven to move in the X-direction by a ball screw 17. The movable member 40 is guided in its movement in the X-direction by means of rollers 9 which move in rolling motion on an inner wall surface of frame 41.

Referring to FIG. 1, an X-direction positional signal generator 12 is mounted on frame 10 and generates as its output an X-direction positional signal which corresponds to the angle of rotation of a gear 45 in meshing engagement with the gear mounted on the output shaft of motor 11. The X-direction positional signal generator 12 may be in the form of a potentiometer.

Referring again to FIG. 1, the X-direction and Y-direction driving devices are bodily movable by means of rollers 14 in a Z-direction of a weld line. The movement of the X-direction and Y-direction driving devices in the Z-direction takes place as a Z-direction driving motor (not shown) and speed reducing gear (not shown) cause rollers 14 to rotate. A Z-direction positional signal for the sensor 2 can be generated by the same mechanism described above. In this embodiment, a gear 47 is mounted on a shaft of one of the rollers 14 and rotates a gear 48 whose angle of rotation is applied to a signal generator 46 secured to a housing 50. The signal generator 46 may be in the form of a potentiometer.

Figure 4:
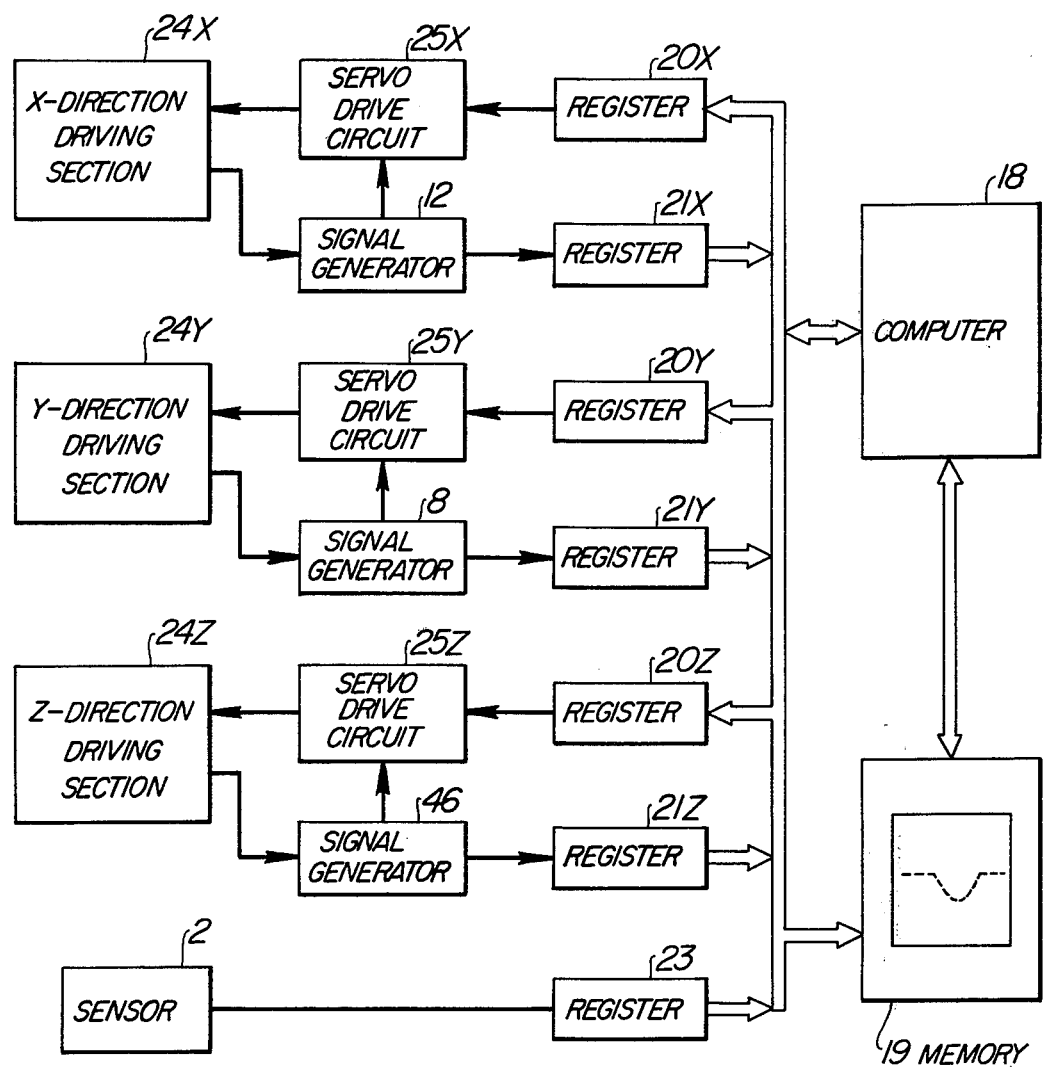
FIG. 4 is a diagrammatic view of a control system of the detecting apparatus according to the invention.

FIG. 4 is a diagram of a control system for the driving mechanism shown in FIGS. 1 to 3. The reference numeral 18 designates a computer which serves to command a position to be taken by the sensor 2 and to effect arithmetic and logical operations to determine the shapes of weld beads on the basis of a detection signal generated by the sensor 2 and X-position, Y-position and Z-position signals for the sensor 2 generated by the position signal generators. The reference numeral 19 designates a memory connected to the computer 18.

Registers 20X, 20Y and 20Z store therein X-direction, Y-direction and Z-direction positional command values for the sensor 2, respectively, which are provided by the computer 18. Registers 21X, 21Y and 21Z store therein output values of the X-direction, Y-direction and Z-direction positional signal generators 12, 8 and 46, respectively. A register 23 stores therein the value of a quantity detected by the sensor 2. The reference numerals 24X, 24Y and 24Z, respectively, designate X-direction, Y-direction and Z-direction driving sections including the X-direction, Y-direction and Z-direction driving motors. The reference numerals 25X, 25Y and 25Z, respectively, designate servo drive circuits which compare the contents of registers 20X, 20Y and 20Z with the output signals of signal generators 12, 8 and 46 and supply driving signals to the X-direction, Y-direction and Z-direction driving sections 24X, 24Y and 24Z, respectively.

In the control system constructed as described above, when the sensor 2 is moved in a certain direction by a certain amount of distance, the amounts of displacement in various directions are determined by the computer 18 dependent upon the distance to be covered by the movement, and positional command values are fed to registers 20X, 20Y and 20Z. As a result, the difference between the command position and the current position determined by the positional signal generators 12, 8 and 46 is determined. Thus, driving signals are produced by the servo drive circuits 25X, 25Y and 25Z, so that the sensor 2 is driven to move in the respective positions. Movement of the sensor 2 is continued until the differences between the output values of the signal generators 12, 8 and 46 and the contents of registers 20X, 20Y and 20Z, respectively, become zero. In this manner the sensor 2 can be driven to move as instructed by the computer 18. The positions of the sensor 2 in various directions can be read into the computer 18 through registers 21X, 21Y and 21Z, respectively, determine the position of the sensor 2 while the latter is collecting information.

Figure 5:
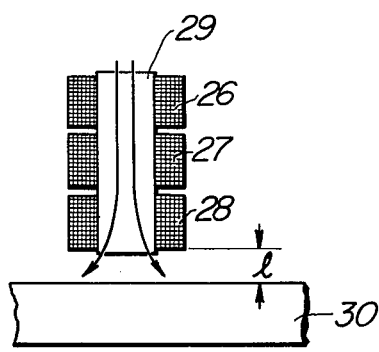
FIG. 5 is a view showing one form of a tactile sensor.
Figure 6:
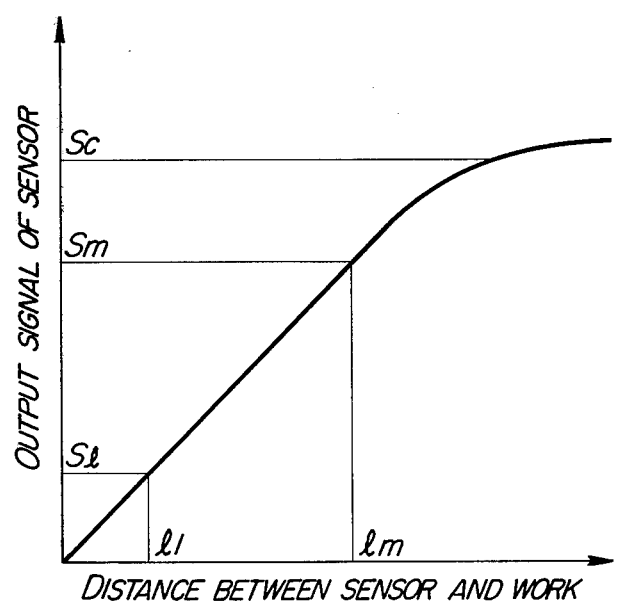
FIG. 6 is a graph showing the characteristic of the tactile sensor shown in FIG. 5.

The sensor 2 may be either of the contact type or non-contact type. As described hereinafter, the sensor 2 will be described as being of the type which generates an electric signal S as shown in FIG. 6 due to the difference in magnetic resistance caused by the distance $l$ between the sensor 2 and a work piece 30 as shown in FIG. 5, in which the sensor 2 comprises a core 29, an exciting coil 26 and detecting coils 27, 28.

As aforesaid, the output of the sensor 2 can be stored in the computer 18 and memory 19 through register 23. The contents of the memory 19 can be modified and changed as desired by arithmetic and logical operations executed by the computer 18.

Figure 7:
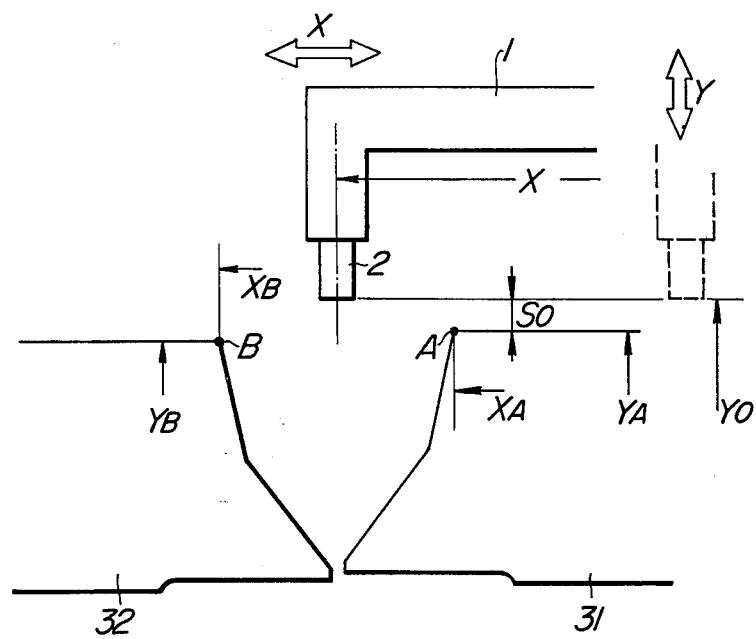
FIG. 7 is a view showing a detection process step according to the invention.

The detecting method according to the invention will now be described in detail with reference to FIGS. 7 to 10. As shown in FIG. 7, the sensor 2 is first moved to a position shown in broken lines which is spaced apart substantially from an edge A of a steel plate 31 to be joined by welding to another steel plate 32. Then, the sensor 2 is moved downward to a position in which the spacing between the sensor 2 and steel plate 31 has a predetermined value So. If the height of the sensor 2 at this time is denoted by Yo, the surface of the steel plate 31 will have a height YA which is equal to (Yo − So). Moving the sensor 2 in the X-direction while keeping its height at the constant level Yo results in signal So generated by the sensor 2 as shown in FIG. 1. That is, when the sensor 2 is moved from right to left in FIG. 7, the output signal S of the sensor 2 becomes greater in value as it draws near the edge A. As shown in FIG. 6, the sensor 2 does not generate the signal S proportional to the distance $l$, if the distance becomes greater than $lm$. Therefore, in spite of the fact that the groove is profiled as shown in FIG. 7, a curve representing the signal S becomes flat in areas from $Xi$ to $(Xi + K)$ where the output signal S of the sensor 2 becomes higher than its saturated output Sc. Although the output of the sensor 2 becomes weakened considerably at edge portions (shown by symbols XA and XB) of the groove, these areas of the curve are substantially similar in form to the area of the curve representing the shape of the groove. Thus, by reading the coordinates XA and XB (the contents of register 21X) of points where the value of the signal S has increased by Δs (this value is set beforehand) as compared with values SA and SB of the output signal S at flat portions of the steel plates 31, 32, it is possible to obtain X-coordinates of the edges A and B. Also, by reading the values SA and SB (the contents of register 23) of the output signal S of the generator 2 at the flat portions of the steel plates 31, 32 and calculating the values of (Yo − SA) and (Yo − SB) by means of the computer 18, it is possible to find the height (coordinate) of the steel plates 31, 32. Thus, the coordinates (XA, Yo − SA) and (XB, Yo − SB) of the edges can be obtained. The Z-coordinate of the edges can be found by the signal generator 46 as aforesaid. The three-dimensional coordinates of the edges can be obtained in this way.

The amount of dislocation can be obtained by calculating the value (SA − SB) by means of the computer 18.

The coordinate of the center of the groove can be found by a simple calculation of (XA + XB)/2.

The groove is generally machined and its shape is relatively accurate. Therefore, if the coordinates of the edges can be obtained accurately, information necessary for automatically performing welding can be obtained.

However, in the event multi-layer padding welding is performed, it is necessary to change the target position of the welding torch in accordance with the shape of a weld bead. This makes it necessary to detect the shape of the weld bead. It is impossible to detect the shape of a deep portion of the groove if detection is performed as shown in FIG. 7 by using the sensor shown in FIG. 5. Accordingly, if it is presumed that a root gap has been closed by welding after padding welding has been performed for several layers, a weld bead shape detection step is initiated. Detection of the shape of the weld bead is performed in a manner to be described hereinafter.

Figure 8:
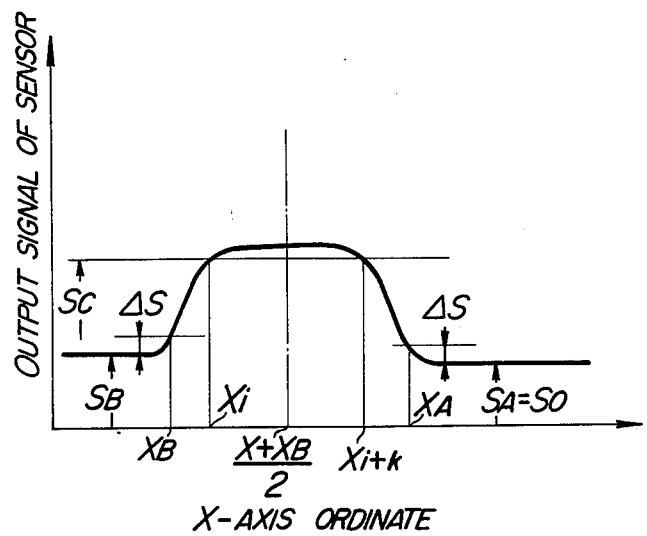
FIG. 8 is a view showing an output signal of the tactile sensor moved by following the process step shown FIG. 7.

If the value of the output signal S of the sensor 2 becomes higher than its saturated signal value Sc, it is impossible to measure the depth accurately as shown in FIG. 8. Therefore, the range for values of which it is impossible to make accurate measurements is first determined. To this end, one has only to read the coordinates $Xi$ and $(Xi + k)$ of the X-axis shown in FIG. 10. Then, the sensor 2 is moved horizontally to a position $Xi$ or $(Xi + k)$ as shown in FIG. 9, and then moved downwardly until the value of the output signal S of the sensor 2 reaches a level ($S_1$ corresponding to a distance $l_1$, for example) at which it is in primary relation to the value of the distance $l$ shown in FIG. 6.

Figure 9:
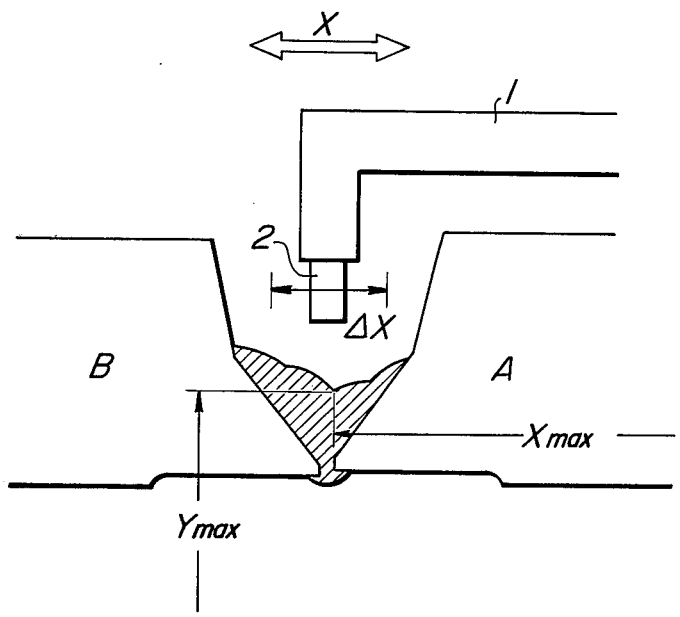
FIG. 9 is a view showing a detection process step according to the invention which is used when a weld bead has a great depth.

Thereafter, the value of the output signal S of the sensor 2 is read in the same manner described above, while the sensor 2 is moved in scanning motion in a range ΔX as shown in FIG. 9. If the sensor 2 is moved downwardly an amount $Y_L$ in the Y-axis direction at this time, then the height Yo − ($Y_L$ + S) of the weld bead can be found from the value of (YL + S) which represents the distance of downward movement of the sensor 2 plus the value of the signal S generated by the sensor 2 after the downward movement thereof has been initiated.

Figure 10:
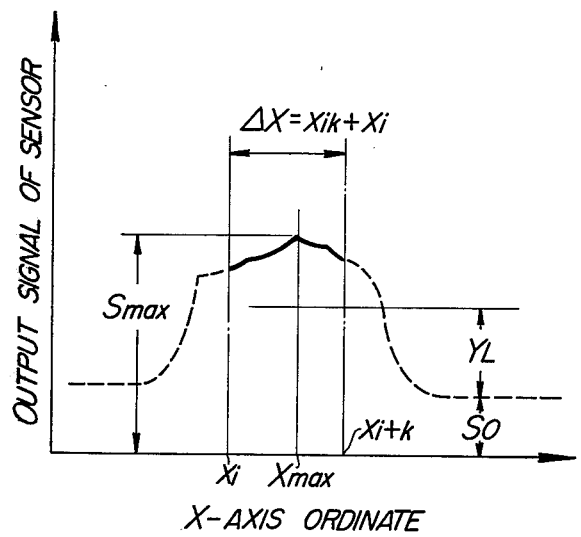
FIG. 10 is a view showing an output of the tactile sensor moved by following the process step shown in FIG. 9.

FIG. 10 shows a signal generated by the sensor 2 and modified as aforesaid after the sensor 2 has been made to move in scanning motion in the range ΔX. As the result of this operation, it can be ascertained that the shape of the weld bead has been accurately detected.

Where multi-layer padding welding is performed as aforesaid the target position of the welding torch is a most deeply recessed portion in many cases. From the result shown in FIG. 10, the recess in the bead can be readily detected. That is, the coordinates (Xmax, Yo − Smax) thereof can be obtained from an X-coordinate at which the signal S generated by the sensor 2 is maximized (Smax) and the Smax itself.

In the above description, the values of sensor output signal S have been shown in curves in FIGS. 8 and 10. Actually, the contents stored in the memory are in the form of numbers which are expressed in the following table.

| X Coordinates | Output of Sensor S | Y Coordinates | Position of Groove or Bead (Y + S) |
|---|---|---|---|
| $X_1$ | $S_1$ | $Y_1$ | $Y_1 + S_1$ |
| $X_2$ | $S_2$ | $Y_2$ | $Y_2 + S_2$ |
| $X_3$ | $S_3$ | $Y_3$ | $Y_3 + S_3$ |
| . | . | . | . |
| . | . | . | . |
| $Xi$ | $Si$ | $Yi$ | $Yi + Si$ |
| $Xi + 1$ | $Si + 1$ | $Yi + 1$ | $Yi + 1 + Si + 1$ |
| . | . | . | . |
| . | . | . | . |
| $Yi + K$ | $Si + K$ | $Yi + K$ | $Yi + K + Si + K$ |
| . | . | . | . |
| . | . | . | . |
| $Xn$ | $Sn$ | $Yn$ | $Yn + Sn$ |

It is widely known that calculation of maximum or minimum values or a value smaller than a certain value by a predetermined value from these numerical values as expressed in the above table can be performed through simple addition, subtraction and logical operations by means of conventional computers.

In the aforementioned description, the detecting method according to the invention has been described with regard to the detection of both edges of a groove and a most deeply recessed portion of a weld bead. It is to be understood that the invention enables detection of the shape of the root of the groove and the included angle thereof to be effected with a high degree of accuracy and precision.

Also, the process for detecting the shape of a groove having a depth of a value higher than a predetermined value has been described as comprising the steps of first moving the sensor in scanning motion in the X-direction and then moving the same in scanning motion in the X-direction again over a certain range after moving the same downwardly in the Y-direction. It is to be understood that the invention is not limited to such process and that the value of the depth of the groove may be determined from the Y-coordinates of the sensor 2 by moving the same in the Y-direction in a manner such that the signal S generated by the sensor 2 may be maintained at a certain constant level. Also, the shape of a deep portion of a weld bead may be detected by moving the sensor 2 downwardly from the time when the signal S generated by the sensor 2 has risen above a certain level.

It also is to be understood that these two processes described above constitute separate embodiments and that either of the two processes may be employed in actual operations.

As aforesaid, the inability of conventional automatic welding machines to detect the shapes of grooves and weld beads with a high degree of precision and accuracy has made it imperative to perform a welding operation in which operators keep watch at all times on the operation performed by the machine. This invention provides a method and an apparatus which enables the detection of the shapes of weld beads to be carried out with a high degree of precision and accuracy. Thus, the invention enables complete automation of welding operations to be realized because the need to provide an operator is eliminated. The method and apparatus according to the invention have a high economic value because they can reduce the time, labor and cost required for performing a welding operation.

I claim:

1. A method for detecting the shapes of weld beads in a multi-layer padding weld comprising the steps of:
    moving a sensor in a scanning motion in a direction perpendicular to a line of the weld bead, said sensor generating an output signal in accordance with the distance between the sensor and an object being detected;
    detecting the unevenness of the weld bead in terms of a change of the output signal of the sensor caused by a change in said distance between the sensor and the surface of the weld bead in the line of scanning;
    determining when the distance detected by said sensor becomes great enough that said sensor is no longer substantially influenced by small changes in said distance; and
    adjusting said distance between the sensor and the object being detected so that the sensor is again influenced by changes in said distance.

2. A method as claimed in claim 1, wherein the sensor is caused to move in scanning motion such that the quantity detected by the sensor remains constant at all times without exceeding a predetermined value.

3. A method as claimed in claim 1, wherein said adjusting step includes the step of determining when the distance detected by the sensor exceeds a predetermined value, and then causing the sensor to move toward the workpiece a distance beyond the predetermined value so as to perform detection again.

4. A method as claimed in claim 1, wherein the sensor is caused to move toward the workpiece to carry out detection when the distance detected by the sensor has reached a predetermined value in moving the sensor in the direction perpendicular to the weld line.

5. An apparatus for detecting the shapes of grooves and weld beads comprising:
    a sensor for generating an output signal proportional to the distance between the sensor and a workpiece thereof;
    means for driving said sensor in the direction perpendicular to a weld line and in the direction of the height of the workpiece respectively;
    means for generating signals indicating the positions of the sensor in the X- and Y-directions respectively;
    means for storing the X- and Y-direction position signals from said signal generating means and the output signal representing the distance detected by said sensor; and
    means for computing the shapes of weld beads on the basis of the contents of said storing means and commanding the X- and Y-direction driving means to move the sensor to commanded positions wherein said computing means includes means for determining when the distance detected by said sensor becomes great enough that said sensor is no longer substantially influenced by small changes in said distance and for commanding said driving means to move said sensor in relation to the workpiece so that said sensor is once again influenced by small changes in said distance.

6. An apparatus as defined in claim 5, wherein said determining means includes means for detecting when the distance detected by said sensor exceeds a predetermined value.

7. An apparatus as defined in claim 6 wherein said sensor comprises a magnetic sensor.

8. An apparatus as defined in claim 7, wherein said predetermined distance value corresponds to the value of said sensor when in saturation.

* * * * *